(12) United States Patent
Chen et al.

(10) Patent No.: US 7,184,266 B1
(45) Date of Patent: Feb. 27, 2007

(54) AUTOMATIC MONITOR SLIDING SYSTEM

(75) Inventors: Jian-Cheng Chen, Shijr (TW); Chun-Chang Shih, Shijr (TW)

(73) Assignee: Boom Electronics Inc., Taipei Hsien (TW)

( * ) Notice: Subject to any disclaimer, the term of this patent is extended or adjusted under 35 U.S.C. 154(b) by 21 days.

(21) Appl. No.: 11/197,372

(22) Filed: Aug. 5, 2005

(51) Int. Cl.
*G06F 1/16* (2006.01)
*F16H 59/00* (2006.01)

(52) U.S. Cl. ............... 361/687; 312/196; 74/335; 400/146

(58) Field of Classification Search ........ 361/679–687, 361/724–727, 695; 312/223.1–223.6, 196; 74/335, 336 R, 473.12; 400/146
See application file for complete search history.

(56) References Cited

U.S. PATENT DOCUMENTS

| | | | | |
|---|---|---|---|---|
| 5,044,792 A | * | 9/1991 | Goto | .................. 400/146 |
| 6,561,050 B2 | * | 5/2003 | Yamamoto | .................. 74/335 |
| 6,827,409 B2 | * | 12/2004 | Michael | .................. 312/223.3 |
| 6,917,516 B2 | * | 7/2005 | Chou | .................. 361/681 |
| 2003/0197451 A1 | * | 10/2003 | Michael | .................. 312/316 |
| 2006/0044445 A1 | * | 3/2006 | Matsumoto et al. | ... 348/333.06 |

* cited by examiner

*Primary Examiner*—Hung Van Duong
(74) *Attorney, Agent, or Firm*—Troxell Law Office PLLC

(57) ABSTRACT

An automatic monitor sliding system comprises a machine case, a slidable structure, a monitor mounting plate, and a monitor structure. The slidable structure is mounted inside a reception chamber of the machine case. The monitor mounting plate is mounted in front of the machine case. The monitor structure is mounted in front of the monitor mounting plate. As a result, the slidable structure slides the monitor structure forward to slant the monitor structure downward for facilitating the user to insert and retrieve the audio-visual disk. Consequently, the automatic monitor sliding system provides the functions of protecting machine, preventing dust, water permeation, and mistouch input, and providing high sliding radian.

7 Claims, 10 Drawing Sheets

AUTOMATIC MONITOR SLIDING SYSTEM

FIELD OF THE INVENTION

The present invention is related to an automatic monitor sliding system, and more particularly to an automatic monitor sliding system that slides and slants the monitor structure downward by the slidable structure to be suitable for any kind of audio-visual device or the like. The slidable structure is mounted inside a reception chamber of the machine case. The monitor mounting plate is mounted in front of the machine case. The monitor structure is mounted in front of the monitor mounting plate. As a result, the slidable structure slides the monitor structure forward to slant the monitor structure downward for facilitating the user to insert and retrieve the audio-visual disk. Consequently, the automatic monitor sliding system provides the functions of protecting machine, preventing dust, water permeation, and mistouch input, and providing high sliding radian.

BACKGROUND OF THE INVENTION

Nowadays the current workers always take two days off a week, and the people pay more attention to spend leisure time gradually. Besides, owing to consumers' desire the manufacturers put lots of manpower in research and development of the car progressively to promote it from the conventional transportation means into the multi-functional means. As a result, the car is becoming equipped with the electronic products to provide more humanization and to satisfy consumers' requirements.

The earlier car usually only equips with the frequency modulation radio to enable the driver to listen to the broadcast. For the purpose of watching movie, the present people also desire to equip the car with the monitor besides the radio. Accordingly, the manufacturers fabricate the monitor that enables the driver to watch a film, listen to broadcast, and make judgment according to the displayed picture. In the existing car monitor, a disk insertion hole of a disk player is formed above a frame and coupled with a monitor structure, wherein a LCD monitor is mounted below the disk insertion hole and several control buttons are mounted under the frame and on the both sides of the frame for controlling the disk player. Because of the limited space of the driver's seat, the size of the display monitor is always limited to 5.8 inches. Accordingly, the small-sized monitor makes the driver or the user unable to watch the picture clearly even if the car is equipped with the monitor. Besides, the disk insertion hole of the disk player is exposed and mounted over the frame. Accordingly, it causes the incursion of dust, drink, or water into the disk player even if the user can insert or retrieve the disk easily. As a result, the function of the monitor is affected.

In order to improve the aforementioned shortcomings, a conventional automatic monitor is disclosed. The automatic monitor comprises a case, a display monitor, and a frame. A disk player is mounted inside the case. The disk insertion hole of the disk player is formed to couple with the frame. In general, the disk insertion hole is mounted above the frame, and the display monitor is mounted under the disk insertion hole. Besides, several control buttons are mounted under the frame and on the both sides of the frame for controlling the disk player. Because of the limited space of the driver's seat, the size of the display monitor is always limited to 5.8 inches. Accordingly, the small-sized monitor makes the driver or the user unable to watch the picture clearly even if the car is equipped with the monitor. Besides, the disk insertion hole of the disk player is exposed and mounted over the frame. Accordingly, it causes the incursion of dust, drink, or water into the disk player even if the user can put the disk easily. As a result, the function of the monitor is affected.

In view of the drawback of the conventional structure, the present inventor makes a diligent study to disclose and provide an automatic monitor sliding system having the functions of protecting machine, preventing dust, water permeation, and mistouch input, and providing high sliding radian for the consumer in accordance with the motive of the present invention.

SUMMARY OF THE INVENTION

It is a main object of the present invention to provide an automatic monitor sliding system to slide and slant the monitor structure downward such that an audio-visual disk player can be mounted behind the monitor structure and the size of the monitor can be enlarged to 7 inches. Furthermore, the present invention is provided with the functions of protecting machine, preventing dust, water permeation, and mistouch input, and providing high sliding radian.

It is another object of the present invention to provide an automatic monitor sliding system, wherein the slidable structure is mounted inside the machine case, and a clutch gear set is mounted inside the slidable structure. The monitor mounting plate is mounted in front of the machine case. The monitor structure is mounted in front of the monitor mounting plate. As a result, the slidable structure slides the monitor structure forward, and the idle rotation is formed automatically if the rotation of the clutch gear set is retained, thereby preventing the driving motor from damage by over-current.

In order to achieve the aforementioned object, an automatic monitor sliding system is disclosed. The automatic monitor sliding system comprises a machine case, a slidable structure, a monitor mounting plate, and a monitor structure. The slidable structure is mounted inside a reception chamber of the machine case. The monitor mounting plate is mounted in front of the machine case. The monitor structure is mounted in front of the monitor mounting plate. As a result, the slidable structure slides the monitor structure forward to slant the monitor structure downward for facilitating the user to insert and retrieve the audio-visual disk. Consequently, the automatic monitor sliding system provides the functions of protecting machine, preventing dust, water permeation, and mistouch input, and providing high sliding radian.

The aforementioned aspects and advantages of the present invention will be readily clarified in the description of the preferred embodiments and the enclosed drawings of the present invention.

DETAILED DESCRIPTION OF THE PREFERRED EMBODIMENT

Figure 1:
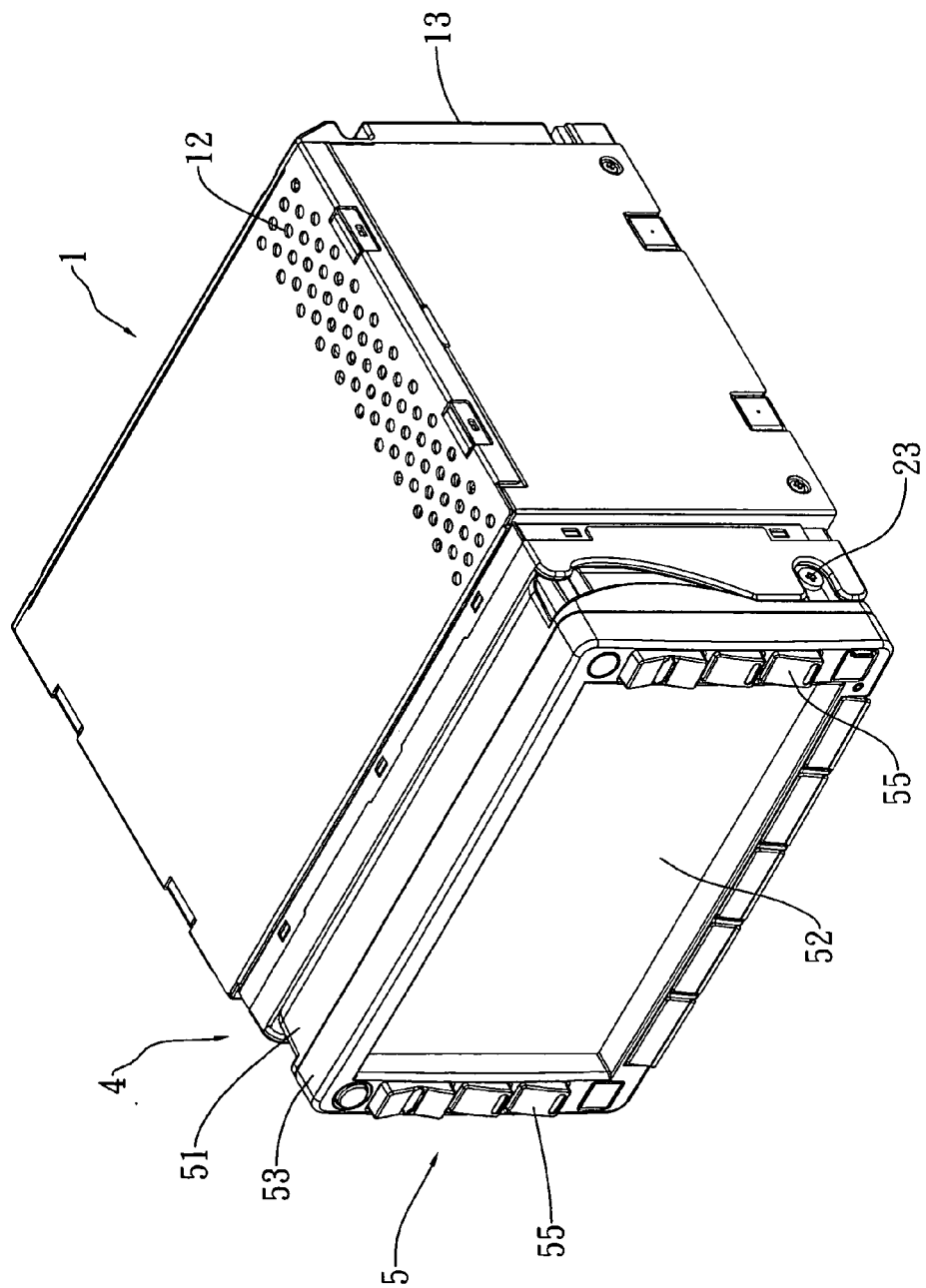
FIG. 1 is a schematic, elevational diagram showing the preferred embodiment of present invention.
Figure 2:
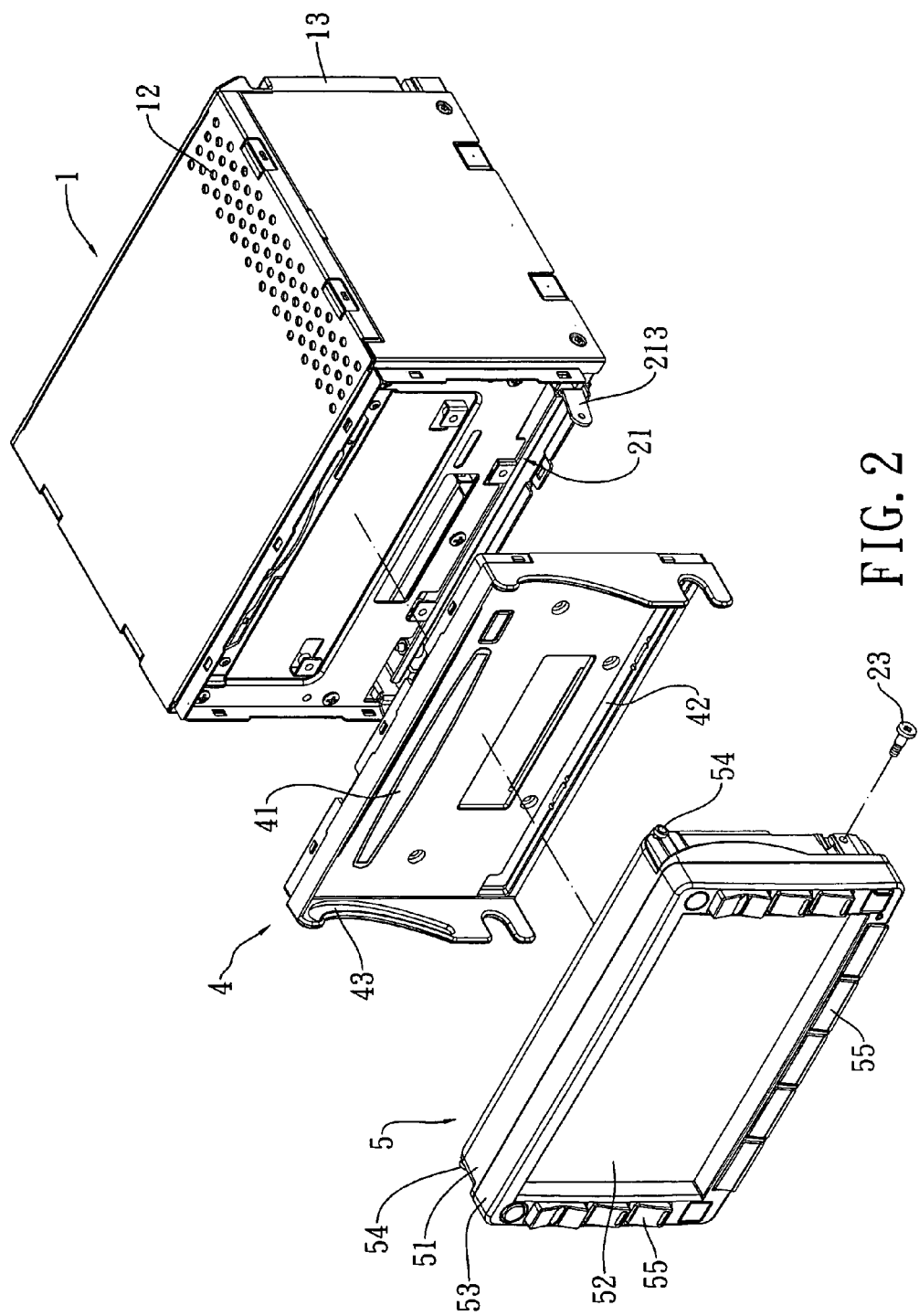
FIG. 2 is a schematic, elevational, exploded diagram showing the preferred embodiment of present invention.
Figure 3:
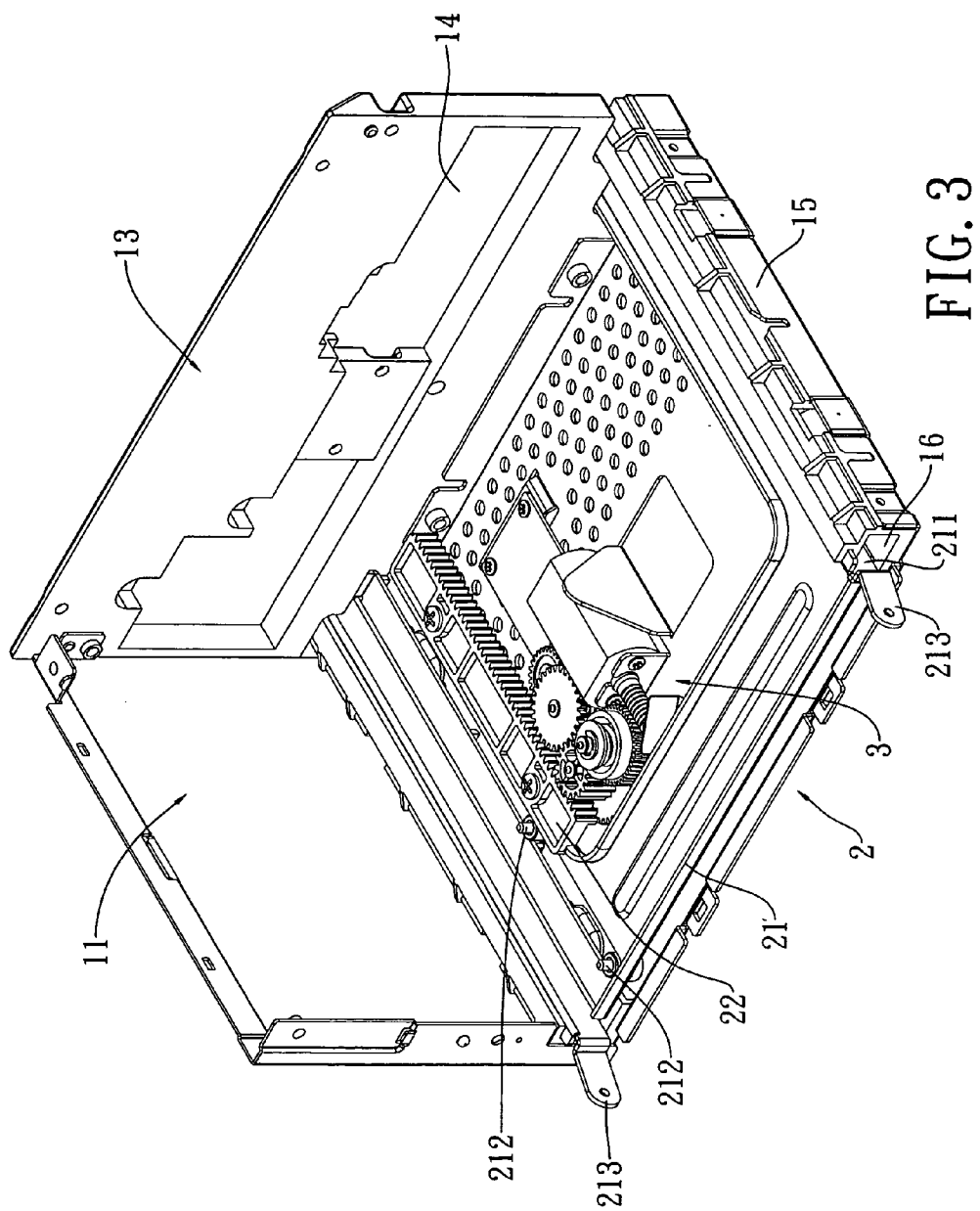
FIG. 3 is a first schematic diagram showing the slidable structure of the preferred embodiment of present invention.
Figure 4:
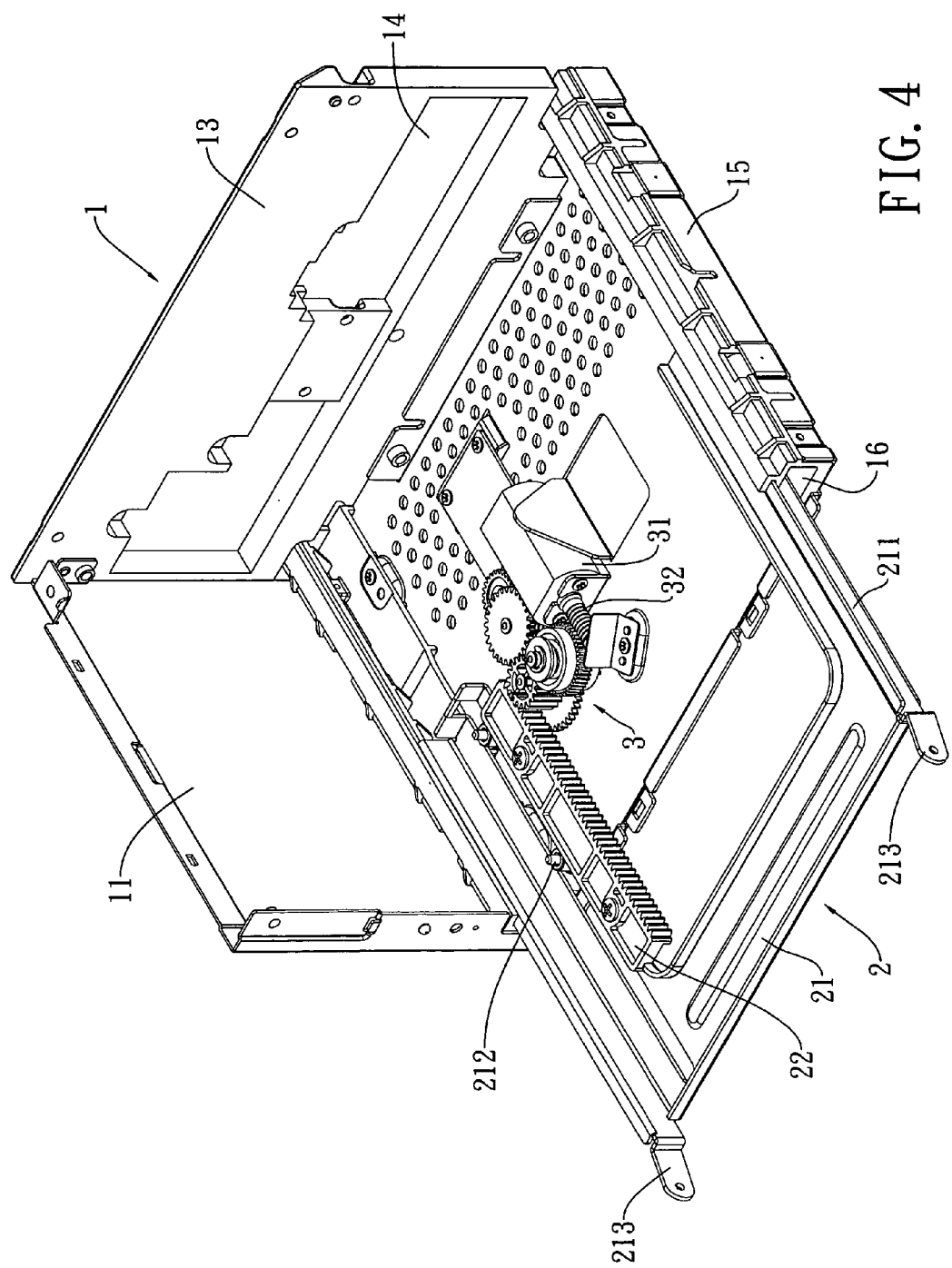
FIG. 4 is a second schematic diagram showing the slidable structure of the preferred embodiment of present invention.
Figure 5:
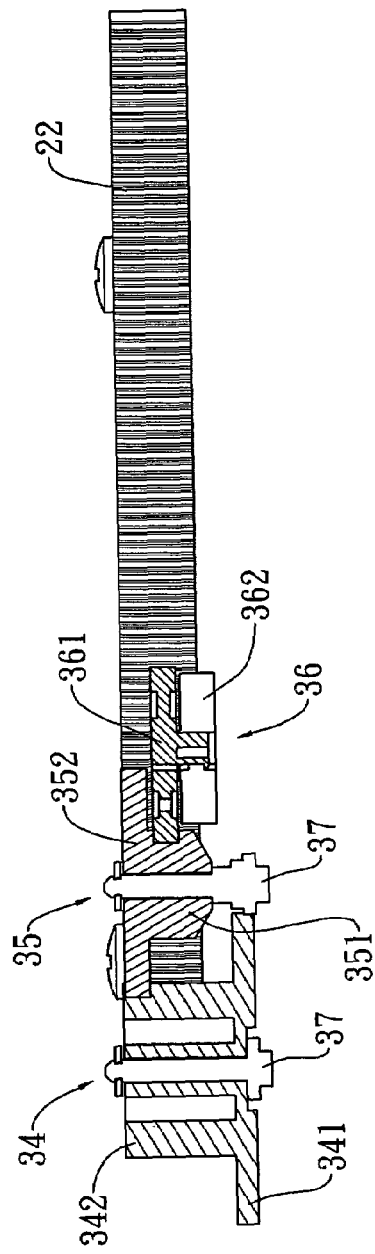
FIG. 5 is a first schematic, cross-sectional diagram showing the transmission system of the preferred embodiment of present invention.
Figure 6:
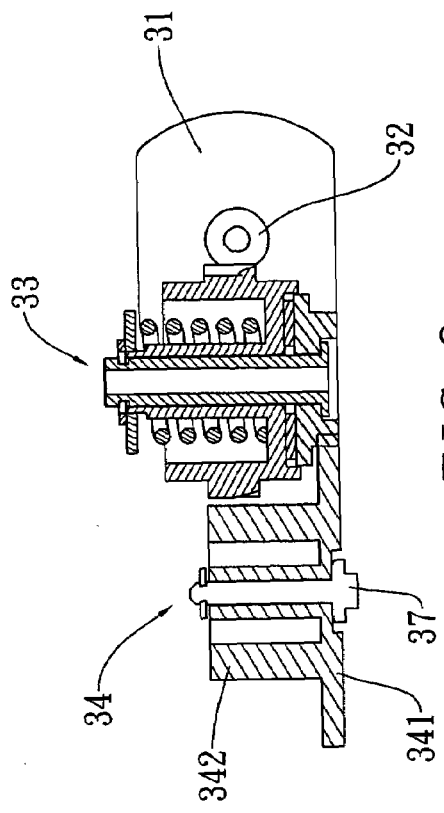
FIG. 6 is a second schematic, cross-sectional diagram showing the transmission system of the preferred embodiment of present invention.
Figure 7:
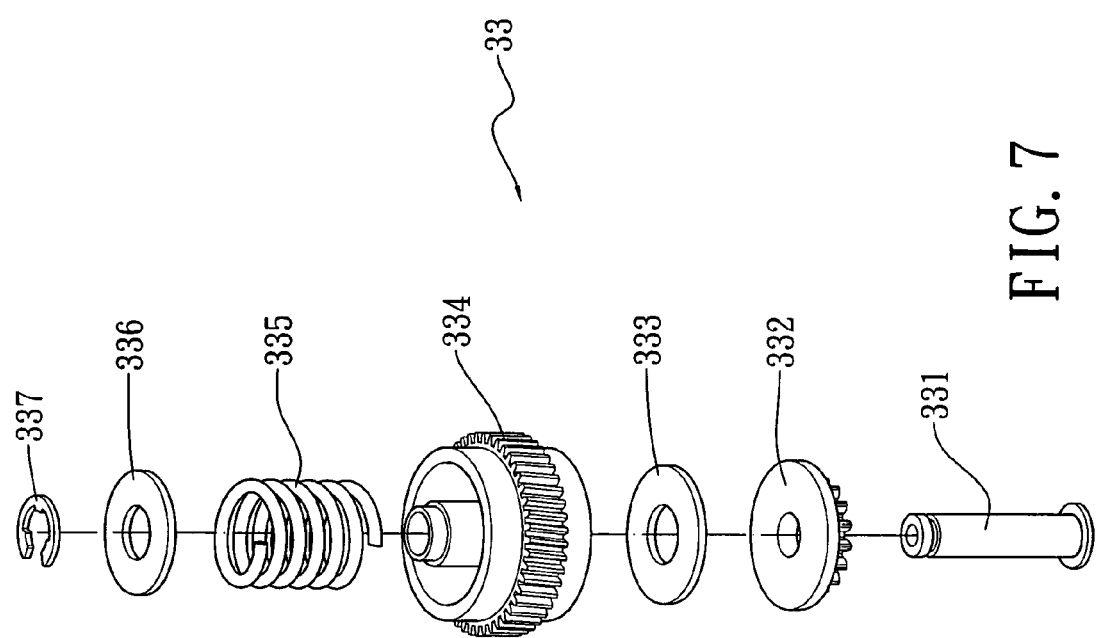
FIG. 7 is an exploded diagram showing the clutch gear set of the preferred embodiment of present invention.

Referring to FIG. 1 to FIG. 3, an automatic monitor sliding system of the present invention is shown. The automatic monitor sliding system comprises a machine case 1, a slidable structure 2, a monitor mounting plate 4, and a monitor structure 5.

The machine case 1 comprises: a reception chamber 11 on which components can be mounted for working; a plurality of heat-dispersing holes 12 on a top case and a bottom case for dispersion of the heat from the inside components to prevent excessive heat from causing the inside components unworkable; a heat-dispersing plate 13 having a transmission interface 14 to which a related signal source is connected for signal transmission; a base 15; and a guide trench 16 mounted on each side of the base 15. The guide trenches 16 are designed in the form of a bar to match the sliding distance.

The slidable structure 2 is mounted inside the machine case 1 and mounted on the interior lower portion of the machine case 1. The slidable structure 2 is composed of an inverted U-shaped frame 21, a rack 22, and a transmission system 3. A slideway 211 is mounted on each side of the inverted U-shaped frame 21 and embedded in the guide trench 16 of the machine case 1. Two shaft wheels 212 are mounted on each of the slideways 211 for forward and backward movement of the inverted U-shaped frame 21. The rack 22 is mounted on one side of the inverted U-shaped frame 21 and smaller than the slideways 211 in length to match the sliding distance. An upwardly bended part 213 is mounted on each outward end of the inverted U-shaped frame 21. The bending angle of the upwardly bended part 213 is about 30 degrees. The upwardly bended parts 213 are screwed onto a back bracket 51 of the monitor structure 5 by screws 23. Each of the screws 23 is designed to have threads on one side and a neat surface on the other side. As a result, the upwardly bended parts 213 are not rotated when sliding and rotating the monitor structure 5. The inverted U-shaped frame 21 is motor-driven by the transmission system 3 mounted inside the machine case 1 for forward and backward movement.

The monitor mounting plate 4 is mounted in front of the machine case 1. An opening 41 is formed on the upper portion of the monitor mounting plate 4 for insertion and retrieve of audio-visual disk. The width of the opening 41 is designed for allowing insertion and retrieve of audio-visual disk. An U-shaped opening 42 is formed on the lower portion of the monitor mounting plate 4 for allowing entrance and exit of the inverted U-shaped frame 21 such that the inverted U-shaped frame 21 can be connected with the monitor structure 5 in a movable manner. Two arc-shaped slideways 43 are mounted on both inner laterals of the monitor mounting plate 4, respectively. The arc-shaped slideways 43 are designed to match the sliding and slant radian of the monitor structure 5 such that the downward sliding and slant of the monitor structure 5 can reach up to about 70 radians.

The monitor structure 5 is mounted in front of the monitor mounting plate 4. The monitor structure 5 comprises a back bracket 51, a touch panel 52, and a front frame 53. Two revolving wheels 54 are mounted on both top corners of the back bracket 51, respectively, for sliding along the arc-shaped slideways 43 of the monitor mounting plate 4. The both lower laterals of the back bracket 51 are coupled with the upwardly bended parts 213 of the inverted U-shaped frame 21, respectively. Accordingly, the inverted U-shaped frame 21 can move forward the monitor structure 5. The touch panel 52 is mounted inside the back bracket 51. The front frame 53 has a hollow inside for being coupled with the touch panel 52. Several control buttons 55 are mounted on the peripheral surface of the front frame 53.

Referring to FIG. 4 to FIG. 7, the automatic monitor sliding system of the present invention is illustrated. The slidable structure 2 is mounted inside the machine case 1 and mounted on the interior lower portion of the machine case 1. The slidable structure 2 is composed of the inverted U-shaped frame 21, the rack 22, and the transmission system 3. The transmission system 3 comprises a driving motor 31, a worm shaft 32, a clutch gear set 33, a direction-changing gear 34, a retarding gear 35, and a sensor 36. The worm shaft 32 is movably connected with the driving motor 31 and driven by the rotation of the driving motor 31. The actuating time of the driving motor 31 is 2 seconds, and the rotation rate of the driving motor 31 is 6500 r/min for driving a worm gear 334, which engages with the driving motor 31, thereby rotating the worm shaft 32. The clutch gear set 33, from bottom to top, comprises: a fixing shaft 331; a spur gear 332; a wool felt pad 333; the worm gear 334; a spring 335; a pad 336; and a C-shaped ring 337. The worm gear 334 is engaged with the worm shaft 32. When rotating the worm shaft 32, the worm gear 334 is driven and rotated by the worm shaft 32 for driving the rotation of the spur gear 332. The spring 335 is mounted inside the worm gear 334, and the wool felt pad 333 is mounted under the worm gear 334 to form the idle rotation automatically if the rotation of the clutch gear set 33 is retained, thereby preventing the driving motor 31 from damage by over-current. The direction-changing gear 34 comprises a first gear 341 and a second gear 342 connected in series from bottom to top by a bearing 37. If the spur gear 332 is driven and rotated by the rotation of the worm gear 334, the spur gear 332 is engaged with the first gear 341 for driving the rotation of the second gear 342 simultaneously. Thereafter, the rack 22 is then driven and rotated by the second gear 342 for slide. Accordingly, the rack 22 can be driven by the second gear 342 to shift forward or backward. The rack 22 is mounted on one side of the inverted U-shaped frame 21 and moved together with the inverted U-shaped frame 21. When sliding the rack 22 by rotation of the second gear 342, the second gear 342 also drives the rotation of the retarding gear 35. The retarding gear 35 comprises a third gear 351 and a fourth gear 352 connected in series from bottom to top by another bearing 37. The second gear 342 is engaged with the fourth gear 352 for rotation together, and the third gear 351 is also driven by the second gear 342 for rotation together. As a result, during the rotation, the retarding gear 35 can retard the moving of the inverted U-shaped frame 21, thereby protecting the sliding of the inverted U-shaped frame 21. Besides, the rotation of the third gear 351 also drives the rotation of the sensor 36. The sensor 36 comprises a sensor gear 361 and a sensor body 362 from top to bottom. The rotation of the third gear 351 also drives the rotation of the sensor gear 361. When rotating the sensor gear 361, the sensor body 362 is capable of receiving an induced rotation rate, thereby allowing the inverted U-shaped frame 21 to reach a movement value of 77 mm and the transmission system 3 to reach an ultimate retardation ratio of 112.5:1 by interactively driving the retarding gear 35 and the direction-changing gear 34 during the sliding of the inverted U-shaped frame 21.

On the basis of the above structure, the automatic monitor sliding system of the present invention is constructed. Referring to FIG. 1 and FIG. 2, the feature of the present invention consists in that the slidable structure 2 slides the monitor structure 5 forward to enable the sliding and slant radian of the monitor structure 5 to reach up to about 70 radians. The automatic monitor sliding system comprises a machine case 1, a slidable structure 2, a monitor mounting plate 4, and a monitor structure 5. The machine case 1 comprises the reception chamber 11. The slidable structure 2 is mounted inside the machine case 1. The monitor mounting plate 4 is mounted in front of the machine case 1. The monitor structure 5 is mounted in front of the monitor mounting plate 4. Accordingly, the present invention is provided with the functions of protecting machine, preventing dust, water permeation, and mistouch input, and providing high sliding radian. Besides, the monitor structure 5 is slid forward by the slidable structure 2, and the idle rotation is formed automatically if the rotation of the clutch gear set 33 is retained, thereby preventing the driving motor 31 from damage by over-current. Consequently, the automatic monitor sliding system is provided with the function of protecting the machine and having high sliding radian.

Figure 8:
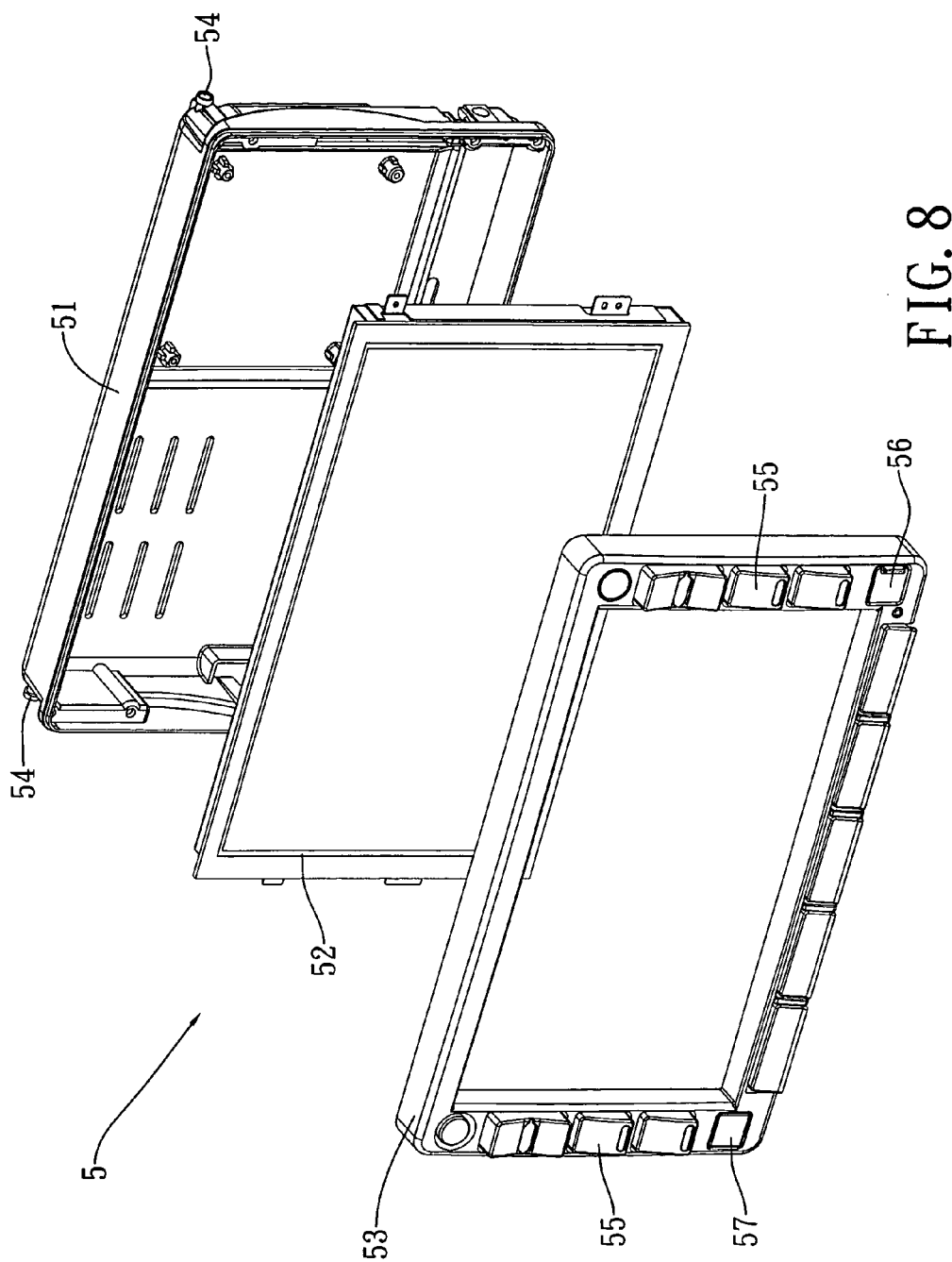
FIG. 8 is an exploded diagram showing the monitor structure of the preferred embodiment of present invention.

Referring to FIG. 2 and FIG. 8, the present invention is related to the automatic monitor sliding system. The monitor structure 5 is mounted in front of the monitor mounting plate 4. The monitor structure 5 comprises the back bracket 51, the touch panel 52, and the front frame 53. Two revolving wheels 54 are mounted on both top corners of the back bracket 51, respectively, for sliding along the arc-shaped slideways 43 of the monitor mounting plate 4. The both lower laterals of the back bracket 51 are coupled with the upwardly bended parts 213 of the inverted U-shaped frame 21, respectively. The upwardly bended parts 213 are screwed onto the back bracket 51 of the monitor structure 5 by screws 23. Each of the screws 23 is designed to have threads on one side and a neat surface on the other side. As a result, the upwardly bended parts 213 are not rotated when sliding and rotating the monitor structure 5, thereby protecting the inverted U-shaped frame 21. The touch panel 52 is mounted inside the back bracket 51. The front frame 53 has a hollow inside for being coupled with the touch panel 52. Several control buttons 55 are mounted on the peripheral surface of the front frame 53. An USB socket 56 is mounted on the front frame 53 for expansion of hardware or software, thereby enabling the user to update data. Besides, a Bluetooth reception antenna 57 is mounted on the front frame 53 for receiving the signal from the Bluetooth equipment to enable the user to update data.

Figure 9:
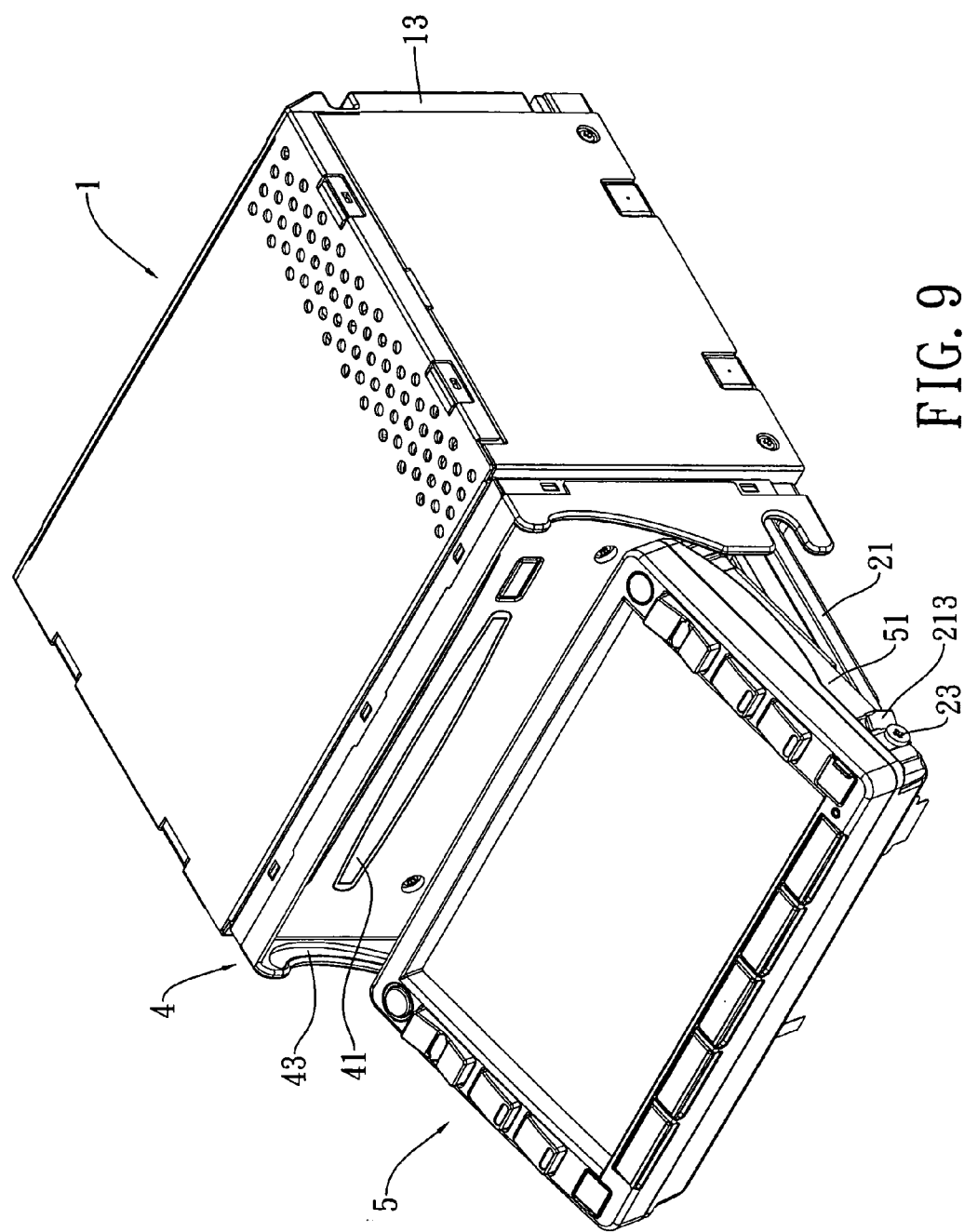
FIG. 9 is a schematic, elevational diagram showing that the monitor structure is slid forward in accordance with the preferred embodiment of present invention.
Figure 10:
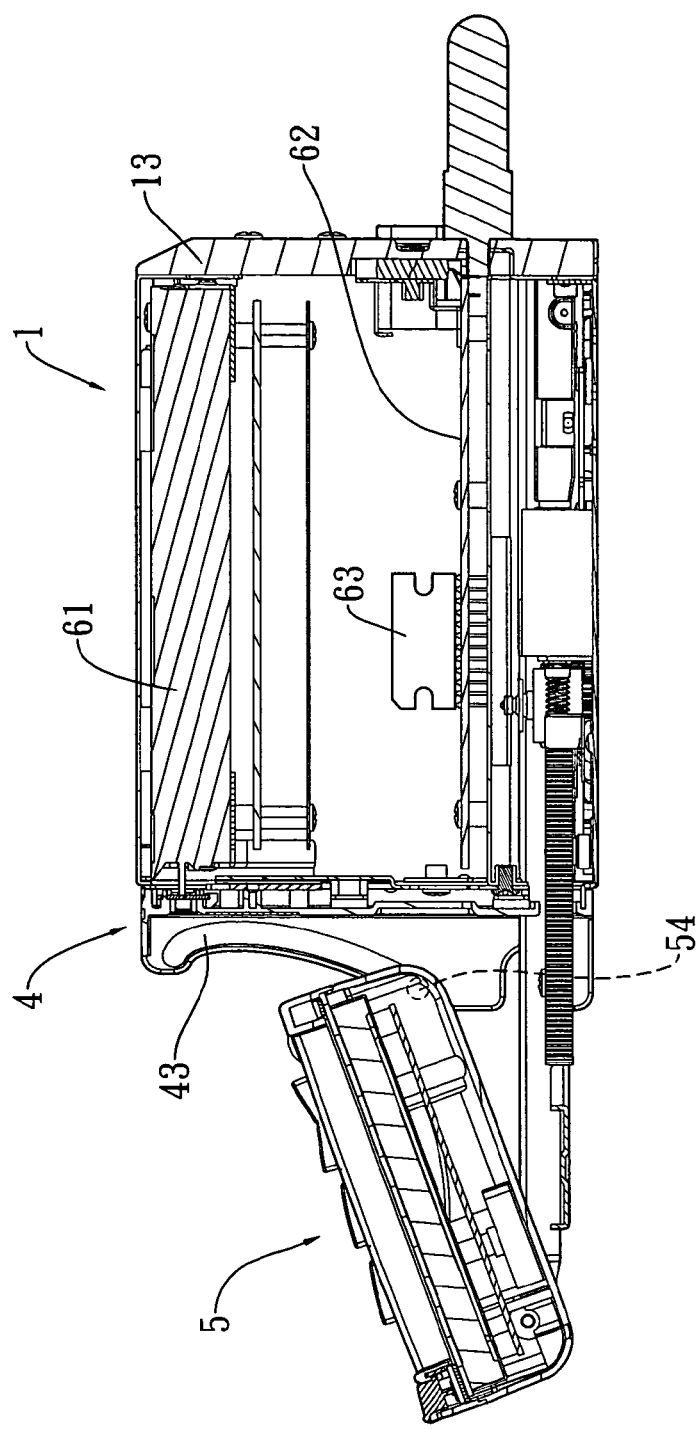
FIG. 10 is a schematic, cross-sectional diagram showing that the monitor structure is slid forward in accordance with the preferred embodiment of present invention.
Figure 11:
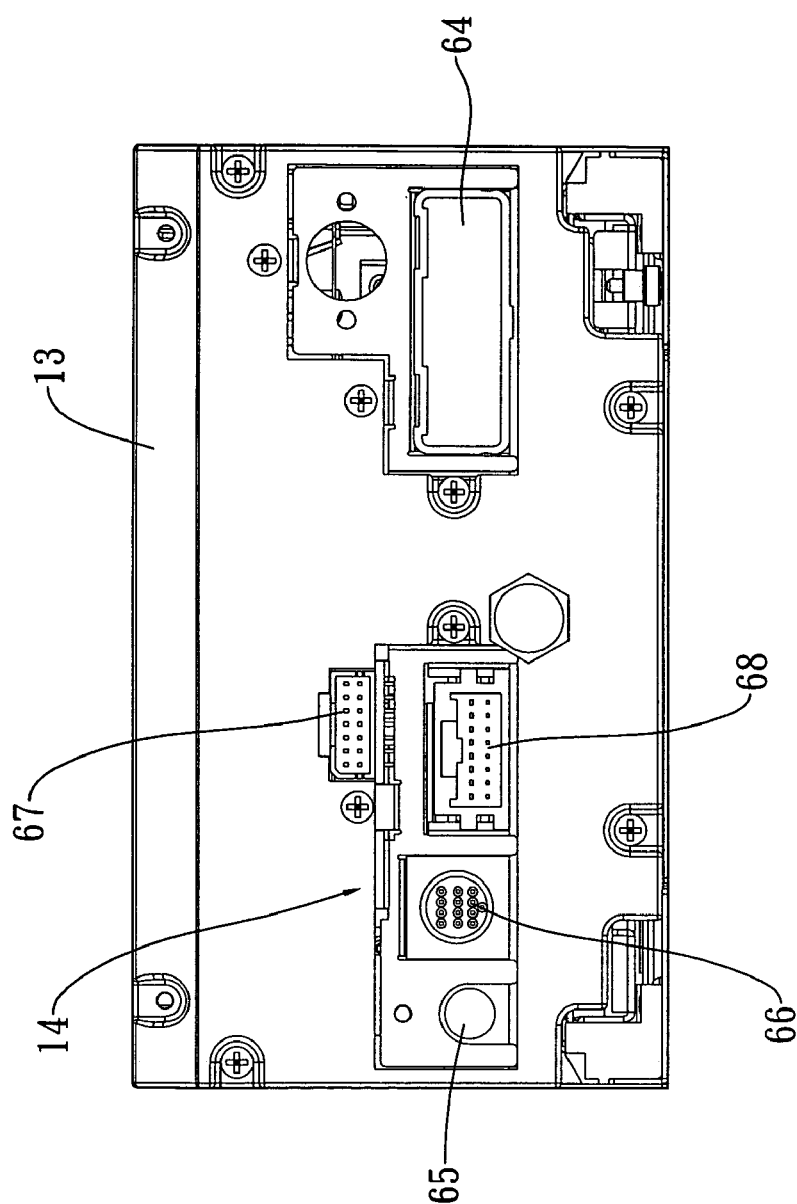
FIG. 11 is a schematic view showing the heat-dispersing plate of the preferred embodiment of present invention.

Referring to FIG. 9 to FIG. 11, the present invention is related to the automatic monitor sliding system. Two revolving wheels 54 are mounted on both top corners of the back bracket 51, respectively, for sliding along the arc-shaped slideways 43 of the monitor mounting plate 4. As a result, the downward slide and slant of the monitor structure 5 can reach up to about 70 radians to expose the opening 41 formed on the upper portion of the monitor mounting plate 4 for inserting and retrieving audio-visual disk. The both lower laterals of the back bracket 51 are coupled with the upwardly bended parts 213 of the inverted U-shaped frame 21 by screws 23, respectively. The inverted U-shaped frame 21 is mounted on the interior lower portion of the machine case 1. An audio-visual player 61 is mounted on the upper portion of the machine case 1 for displaying the audio-visual disk. Besides, a circuit board 62 is mounted on the middle portion of the machine case 1 for controlling the action of all hardware. An integrated circuit (IC) 63 is mounted on the circuit board 62 for storing the related software. The transmission interface 14 is mounted on the heat-dispersing plate 13 of the machine case 1. The transmission interface 14 comprises a power socket 64, an ANT signal reception hole 65, a NAVI signal input hole 66, a NAVI power socket 67, and a signal transmission socket 68 for multi-cassette changer. As a result, the transmission interface 14 can transmit the above-mentioned signal to the circuit board 62 to actuate the operation of the hardware by loop. The signal transmission socket 68 for multi-cassette changer is additionally connected to a multi-cassette changer such that much more disks can be stored simultaneously to prevent the driver from distraction in changing the disks. Consequently, the safe driving can be ensured.

The automatic monitor sliding system of the present invention provides the functions of protecting machine, preventing dust, water permeation, and mistouch input, and providing high sliding radian. Accordingly, the present invention is submitted for a patent since it satisfies all requirements for a patent.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What the invention claimed is:

1. An automatic monitor sliding system, comprising:
a machine case comprising: a reception chamber; a plurality of heat-dispersing holes; a heat-dispersing plate having a transmission interface; a base; and a guide trench mounted on each side of the base;
a slidable structure mounted inside the machine case, the slidable structure being composed of an inverted U-shaped frame, a rack, and a transmission system, a slideway being mounted on each side of the inverted U-shaped frame and embedded in the guide trench of the machine case, the rack being mounted on one side of the inverted U-shaped frame, an upwardly bended part being mounted on each outward end of the inverted U-shaped frame, the transmission system comprising: a driving motor; a worm shaft; a clutch gear set; a direction-changing gear; a retarding gear; and a sensor, the worm shaft being movably connected with the driving motor and driven by the rotation of the driving motor, the clutch gear set, from bottom to top, comprising: a fixing shaft; a spur gear; a wool felt pad; a worm gear; a spring, a pad; and a C-shaped ring, the worm gear being engaged with the worm shaft, the worm gear being driven and rotated by the worm shaft for driving the rotation of the spur gear when rotating the worm shaft, the spring being mounted inside the worm gear, and the wool felt pad being mounted under the worm gear to form the idle rotation automatically if the rotation of the clutch gear set is retained, the direction-changing gear comprising a first gear and a second gear from bottom to top, the spur gear being engaged with the first gear for driving the rotation of the second gear simultaneously, the rack being driven and rotated by the second gear for sliding the inverted U-shaped frame, the retarding gear comprising a third gear and a fourth gear from bottom to top, the second gear being engaged with the fourth gear for rotation together, and the third gear being also driven and rotated by the second gear, the sensor comprising a sensor gear and a sensor body from top to bottom, the sensor gear being rotated by the third gear to enable the sensor body to receive an induced rotation rate;

a monitor mounting plate mounted in front of the machine case, the monitor mounting plate comprising an opening on an upper portion for inserting and retrieving an audio-visual disk; an U-shaped opening on a lower portion for allowing entrance and exit of the inverted U-shaped frame; and two arc-shaped slideways on both inner laterals, respectively, for downward slide and slant of the monitor structure; and a monitor structure mounted in front of the monitor mounting plate, the monitor structure comprising: a back bracket; a touch panel; a front frame; and two revolving wheels on both top corners of the back bracket, respectively, for sliding along the arc-shaped slideways of the monitor mounting plate, the both lower laterals of the back bracket being coupled with the upwardly bended parts of the inverted U-shaped frame, respectively, for moving the monitor structure, the touch panel being mounted inside the back bracket, the front frame having a hollow inside for being coupled with the touch panel, a plurality of control buttons being mounted on a peripheral surface of the front frame, whereby the monitor structure is slid forward for downward slant by the slidable structure to facilitate user to insert and retrieve the audio-visual disk and to provide the functions of protecting machine, preventing dust, water permeation, and mistouch input, and providing high sliding radian.

2. The automatic monitor sliding system of claim 1, wherein the transmission interface is mounted on the heat-dispersing plate of the machine case, and transmission interface comprises: a power socket; an ANT signal reception hole; a NAVI signal input hole; a NAVI power socket; and a signal transmission socket for multi-cassette changer.

3. The automatic monitor sliding system of claim 1, wherein the upwardly bended parts are screwed onto the back bracket of the monitor structure by a plurality of screws, and each of the screws is designed to have threads on one side and a neat surface on the other side.

4. The automatic monitor sliding system of claim 1, wherein the worm shaft is driven and rotated by the rotation of the driving motor for further driving the worm gear.

5. The automatic monitor sliding system of claim 1, wherein an ultimate retardation ratio of the transmission system is 112.5:1.

6. The automatic monitor sliding system of claim 1, wherein the front frame further comprises an USB socket for enabling user to update data.

7. The automatic monitor sliding system of claim 1, wherein the front frame further comprises a Bluetooth reception antenna to enable user to update data.

* * * * *

UNITED STATES PATENT AND TRADEMARK OFFICE
CERTIFICATE OF CORRECTION

PATENT NO. : 7,184,266 B1  Page 1 of 1
APPLICATION NO. : 11/197372
DATED : February 27, 2007
INVENTOR(S) : Jian-Cheng Chen et al.

It is certified that error appears in the above-identified patent and that said Letters Patent is hereby corrected as shown below:

On the title page, item (73) should read as follows:

--(73) Assignee: Bcom Electronics Inc., Taipei Hsien (TW)--

Signed and Sealed this

Seventh Day of August, 2007

JON W. DUDAS
*Director of the United States Patent and Trademark Office*